United States Patent

Nickey et al.

[11] Patent Number: 5,970,748
[45] Date of Patent: Oct. 26, 1999

[54] GLASS GOB SHEAR BLADE MOUNTING APPARATUS

[75] Inventors: George A. Nickey, Maumee; Jeffrey W. Cramer, Liberty Center, both of Ohio

[73] Assignee: Owens-Brockway Glass Container Inc., Toledo, Ohio

[21] Appl. No.: 08/976,049

[22] Filed: Nov. 21, 1997

[51] Int. Cl.⁶ .................................................... C03B 7/11
[52] U.S. Cl. ................................ 65/334; 65/174; 83/600; 83/623; 83/640; 83/641
[58] Field of Search ........................ 65/174, 334; 83/600, 83/623, 640, 641

[56] References Cited

U.S. PATENT DOCUMENTS

| | | | |
|---|---|---|---|
| 1,512,412 | 10/1924 | Ferngren | 65/327 |
| 2,158,708 | 5/1939 | Stuckey | 65/122 |
| 3,467,514 | 9/1969 | McNamara | 65/334 |
| 3,490,326 | 1/1970 | McNamara | 83/600 |
| 3,758,286 | 9/1973 | Heyne | 65/334 |
| 3,850,607 | 11/1974 | Cook | 65/334 |
| 4,214,497 | 7/1980 | Dahms | 83/640 |
| 4,499,806 | 2/1985 | Mumord | 83/527 |
| 5,573,570 | 11/1996 | Leidy et al. | 65/334 |
| 5,772,718 | 7/1998 | Flynn | 65/133 |

*Primary Examiner*—Sean Vincent

[57] ABSTRACT

Glass gob shearing apparatus having opposed shear blades that reciprocate along generally parallel, opposed horizontal paths to periodically bring the shearing ends of the shear blades into partly overlapping contact with one another, to thereby shear a gob of molten glass from a stream of molten glass flowing downwardly between the shear blades. Contact loads between the shear blades are reduced by placing a shim between one of the shear blades, namely the shear blade that is the lower of the shear blades when they are in contact with each other, to thereby impart a slight downward inclination to such shear blade with respect to the other shear blade. Contact loads between the shear blades are further reduced by resiliently mounting the other shear blade to the blade holder to which it is attached, and this is done by positioning curved spring washers between the other shear blade and the blade holder to which it is attached.

5 Claims, 1 Drawing Sheet

GLASS GOB SHEAR BLADE MOUNTING APPARATUS

BACKGROUND OF THE INVENTION

1. Field of the Invention

This invention relates to mounting apparatus for mounting opposed sets of blades of glass gob shearing devices for shearing, streams of molten glass into individual gobs.

2. Description of the Prior Art

A device for shearing a spaced-apart plurality of streams of molten glass into individual gobs is disclosed in U.S. Pat. 5,573,570 (Leidy et al.), which is assigned to the assignee of this application, the disclosure of which is incorporated by reference herein. According to the disclosure of the aforesaid '570 patent, each stream of glass is periodically severed into individual gobs by an opposed set of shear blades each of which is mounted on a carriage. The opposed carriages are periodically reciprocated toward and done away from one another to bring the free, shearing, ends of the blades carried thereby into overlapping contact with one another, to thereby shear the streams of glass passing therebetween, and then out of overlapping contact with one another to permit the glass stream to pass therebetween and thereby present additional molten glass to be sheared into yet another gob. In modern practice, typically the molten glass is presented to the shearing device in a plurality of co-planar, spaced apart streams, usually three or four such streams, and each of the opposed shear blade carrying carriages carries one linear shear blade for each of the glass streams it is to be used with.

For proper shearing action, the shearing ends of the opposed blades in each set must make physical contact with one another. Such physical contact, which must be repeated quite often over a prolonged period of time, can lead to impact damage of the shear blades if the problem of excessive contact loads is not properly addressed. Heretofore, this has been done by periodically readjusting the position of one or both of the opposed shear blade carriages. However, this is a time consuming procedure and leads to lost production during periods of blade carriage readjustment.

SUMMARY OF THE INVENTION

According to the present invention there is provided glass gob shearing apparatus in which opposed shear blades make physical contact with one another without excessive contact loads that could otherwise lead to blade damage or premature blade wear. The apparatus of the present invention employs a mounting block for mounting a shear blade to a blade carrying carriage, and a shim is employed between the distant, non-shearing end of one of the blades and the carriage to which it is attached to provide a slight downward inclination to such blade from a parallel orientation of such blade to its opposed blade, to thereby reduce the contact loads between the blades at the moment of contact therebetween. Further, curved or spring washers are employed in the connection of the non-shearing end of the opposed shear blade to its mounting block to permit such blade to flex upwardly at the moment of contact with the downwardly inclined shear blade to further reduce the contact loads between the blades at and after the moment of contact therebetween.

Accordingly, it is an object of the present invention to provide an improved shearing apparatus for shearing gobs of molten glass from one or more streams of molten glass. More particularly, it is an object of the present invention to provide shearing apparatus of the foregoing character in which contact loads between opposed blades of such shearing apparatus are reduced, to thereby extend the useful lives of such shear blades.

For a further understanding of the present invention and the objects thereof, attention is directed to the drawing and the following brief description thereof, to the detailed description of the preferred embodiment and to the appended claims.

DESCRIPTION OF THE PREFERRED EMBODIMENT

Figure 1:
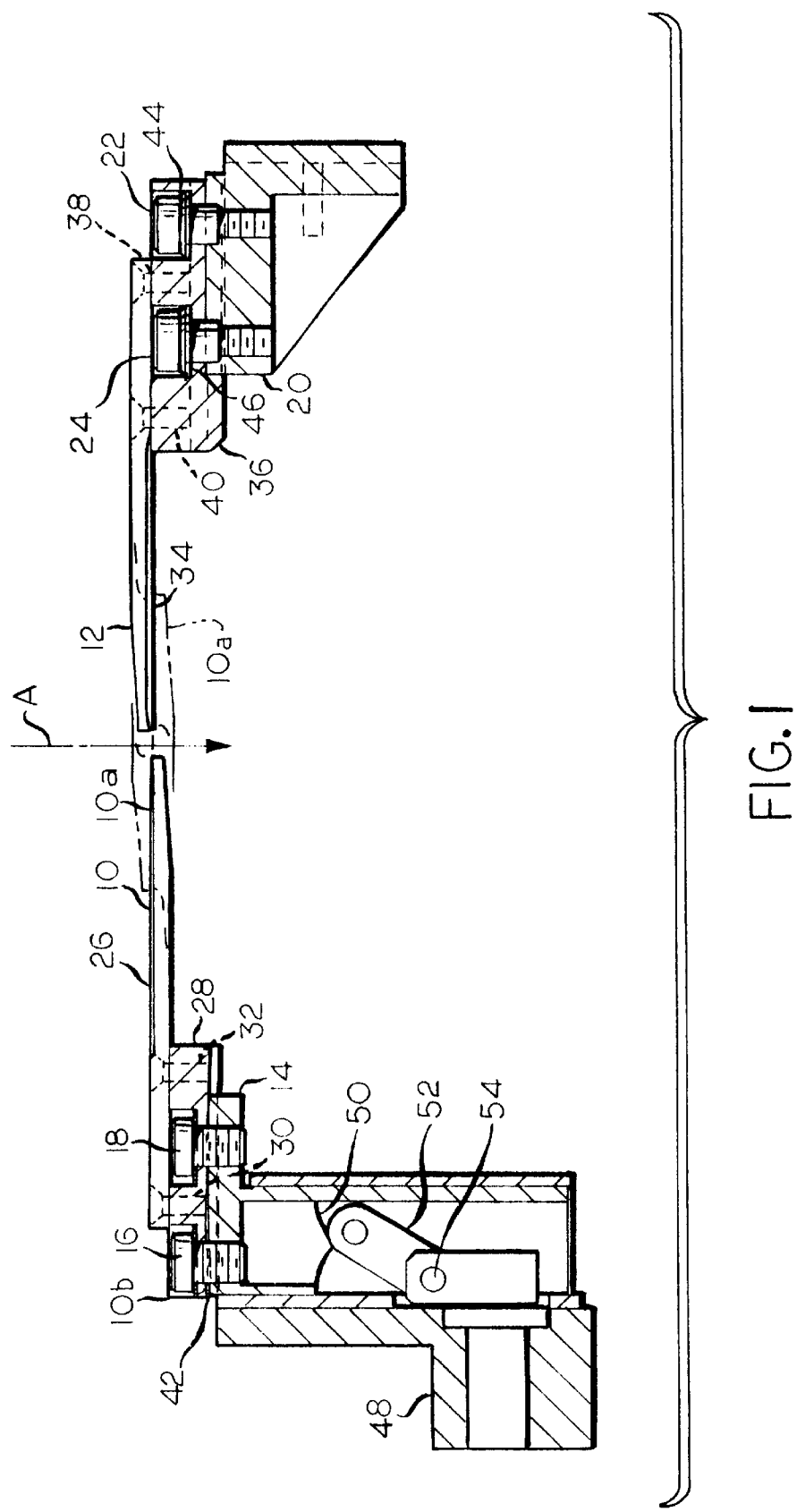
FIG. 1 is an elevation view, partly in cross section, of glass gob shearing apparatus according to the preferred embodiment of the present invention.

Shearing apparatus according to the preferred embodiment of the present invention includes an opposed pair of hardened steel shear blades 10, 12. Shear blade 10 is attached to a blade holder 14 by a spaced-apart pair of cap screws 16, 18, which pass through the blade 10 at a location remote from a shearing end 10a thereof. Likewise, the shear blade 12 is attached to a blade holder 20 by a spaced-apart pair of cap screws 22, 24, which pass through the blade 12 at a location remote from a shearing end 12a thereof. The blade holders 14, 20, are attached to carriages such as the carriage 48 to which the blade holder 14 is attached, which are caused to simultaneously reciprocate along oppositely directed, substantially parallel paths, preferably rectilinear paths, to periodically bring the shearing ends 10a, 12a of the blades 10, 12, respectively, into partly overlapping relationship, at which time they will coact to sever a gob of molten glass from a stream of molten glass passing between the shear blades 10, 12, as is generally described in the aforesaid '570 Patent. The shearing ends 10a, 12a of the shear blades 10, 12 are illustrated in phantom line in the drawing in their overlapping, shearing positions, it being understood that the glass stream to be severed thereby passes downwardly along the arrow A.

In actuality, the blade 10 is of two-piece construction, having a thin hardened steel blade element 26 securely attached to a backup element 28, which is the element that is directly affixed to the blade holder 14, because the blade element 26 is subject to considerable wear in service and must be periodically removed for replacement or resharpening. In that regard, screws 30, 32 are provided to secure the blade element 26 of the shear blade 10 to the backup element 28 thereof. Likewise, the blade 12 is of two-piece construction, having a thin hardened steel blade element 34 securely attached to a backup element 36, which is the element that is directly affixed to the blade holder 20, screws 38, 40 being provided to secure the blade element 34 of the shear blade 12 to the backup element 36 thereof.

To reduce the contact loads between the shear blades 10, 12 at the time of contact therebetween, the lower of the shear blades 10, 12, shown as the shear blade 10, is provided with a slight downward taper from a true, substantially parallel orientation it would otherwise usually have with respect to the upper of the shear blades, shown as the shear blade 12. In the illustrated embodiment, a downward orientation is imparted to the shear blade 10 by inserting a thin metallic shim 42 between the rearward non-shearing end 10b of the shear blade 10 and the blade holder 14, specifically between the backup element 28 of the shear blade 10 and the blade holder 14. To further reduce the contact loads between the shear blades 10, 12 at the time of contact therebetween, and thereafter while the shear blades 10, 12 remain in contact, the higher of the shear blades 10, 12, shown as the shear blade 12, is resiliently secured to the blade holder 20. To that end, curved spring washers 44, 46 are positioned around the cap screws 22, 24, respectively, at the location where the shear blade 12, specifically the backup element 36 thereof, is secured to the blade holder 20. Thus, the blade element 34 of the shear blade 12 can flex upwardly when its underside is engaged by the blade element 26 of the shear blade 10 to maintain the shear blades 10, 12 in contact with one another without excessive contact loads therebetween.

The blade holder 14 for the shear blade 10 is attached to the reciprocating carriage 48 in a manner that will permit the blade holder 14 to be vertically adjusted with respect to the carriage 48. To that end, the blade holder 14 is provided with a cam surface 50, and the carriage 48 is provided with a link 52. An end of the link 52 is pivotally secured to the carriage 48 at an axis 54, and an opposed end of the link 52 slidingly engages the cam surface 50. An adjustment mechanism (not shown) is provided to cause the link 52 to move through small arcs, clockwise or counter clockwise as required, to cause the blade holder 14 to rise or fall with respect to the carriage 48, to thereby optimize the contact between the shear blade 10 and the shear blade 12. In a shear blade installation for simultaneously shearing a plurality of coplanar streams of molten glass, such as that described in the '570 Patent, there will be multiple sets of shear blades 10, 12 on opposite sides of the plurality of streams, one set of shear blades 10, 12 for each stream, and the vertical adjustment of the shear blades on one of the sides of the plurality of streams, as heretofore described, may either be a single vertical adjustment for all such shear blades or a plurality of such vertical adjustments, one for each of such shear blades Although the best mode contemplated by the inventors for carrying out the present invention as of the filing date hereof has been shown and described herein, it will be apparent to those skilled in the art that suitable modifications, variations and equivalents made be made without departing from the scope of the invention, such scope being limited solely by the terms of the following claims and the legal equivalents thereof.

What is claimed is:

1. Apparatus for shearing a stream of molten glass into individual globs, said apparatus comprising:

a first shear blade having a shearing end and a distant end, said first shear blade being moveable toward and away from a stream of molten glass to periodically bring said shearing end of said first shear blade into contact with the stream of molten glass;

a second shear blade having a shearing end and a distant end, said second shear blade being moveable toward and away from the stream of molten glass to periodically bring said shearing end of said second shear blade into contact with the stream of molten glass and with said shearing end of said first shear blade;

means for mounting one of said first shear blade and said second shear blade to position said one of said first shear blade and said second shear blade slightly out of parallel with the other of said first shear blade and said second shear blade, to thereby reduce contact loads whereby said first shear blade and said second shear blade make contact with one another; and means for resiliently mounting the other of said first shear blade and said second shear blade to permit said other of said first shear blade and said second shear blade to deflect upon engagement with said one of said first shear blade and said second shear blade to further reduce contact loads when said first shear blade and said second shear blade make contact with one another;

wherein said second shear blade comprises a second blade element, a second backup element, and means for securing said distant end of said second blade element to said second backup element, wherein said means for resiliently mounting comprises a second blade holder, means for securing said second backup element to said second blade holder, curved spring washer means positioned between said second backup element and said second blade holder, second curved spring washer means positioned between said second backup element and said second blade holder, said second curved spring washer means being spaced from said curved spring washer means along an axis extending from said shearing end to said distant end of said other of said first shear blade and said second shear blade.

2. Apparatus according to claim 1 wherein each of said first shear blade and said second shear blade is generally horizontally disposed, said first shear blade being positioned below said second shear blade when said first shear blade and said second shear blade are in contact with one another, said means for mounting said first shear blade at an angle extending slightly downwardly with respect to said second shear blade.

3. Apparatus according to claim 1 wherein each of said first shear blade and said second shear blade is generally horizontally disposed, and further comprising:

means for vertically adjusting the position of one of said first shear blade and said second shear blade.

4. Apparatus according to claim 1 wherein said first shear blade comprises:

a first blade element;

a first backup element; and means for securing said distant end of said first blade element to said first backup element.

5. Apparatus according to claim 4 wherein said means for mounting comprises:

a first blade holder;

means for securing said first backup element to said first blade holder; and shim means positioned between said first backup element and said first blade holder.

* * * * *